United States Patent
Akasaka

(10) Patent No.: US 12,461,056 B2
(45) Date of Patent: Nov. 4, 2025

(54) GAS SENSOR

(71) Applicant: ROHM CO., LTD., Kyoto (JP)

(72) Inventor: Shunsuke Akasaka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 24 days.

(21) Appl. No.: 17/664,145

(22) Filed: May 19, 2022

(65) Prior Publication Data

US 2022/0381724 A1 Dec. 1, 2022

(30) Foreign Application Priority Data

May 31, 2021 (JP) .................................. 2021-090825

(51) Int. Cl.
*G01N 27/407* (2006.01)
*G01N 27/406* (2006.01)

(52) U.S. Cl.
CPC ..... *G01N 27/4071* (2013.01); *G01N 27/4067* (2013.01); *G01N 27/4074* (2013.01)

(58) Field of Classification Search
CPC .......... G01N 27/4071; G01N 27/4067; G01N 27/4074; G01N 27/4077
See application file for complete search history.

(56) References Cited

U.S. PATENT DOCUMENTS

| | | | | |
|---|---|---|---|---|
| 4,595,485 A | * | 6/1986 | Takahashi | G01N 27/4065 204/192.15 |
| 2015/0377823 A1 | * | 12/2015 | Akasaka | G01N 27/4074 156/60 |
| 2017/0122898 A1 | * | 5/2017 | Akasaka | G01N 27/4077 |
| 2018/0100842 A1 | * | 4/2018 | Ahn | G01N 27/128 |

FOREIGN PATENT DOCUMENTS

WO   WO-2017014033 A1 *  1/2017  ............. G01N 27/41

OTHER PUBLICATIONS

Akasak, English translation of WO2017014033A1, 2017 (Year: 2017).*

* cited by examiner

*Primary Examiner* — Luan V Van
*Assistant Examiner* — Shizhi Qian
(74) *Attorney, Agent, or Firm* — HSML P. C.

(57) ABSTRACT

A gas sensor includes: a substrate; an insulating layer arranged over the substrate; and a solid electrolyte layer, wherein the substrate is formed with a cavity that penetrates the substrate in a thickness direction of the substrate, wherein the insulating layer has a peripheral portion arranged over the substrate around the cavity, and a membrane portion which is located over the cavity and is connected to the peripheral portion, wherein the membrane portion includes a movable portion, wherein a through-hole, which penetrates the membrane portion around the movable portion in the thickness direction, is formed such that the movable portion is capable of being displaced along the thickness direction, and wherein the solid electrolyte layer is arranged over the movable portion.

5 Claims, 11 Drawing Sheets

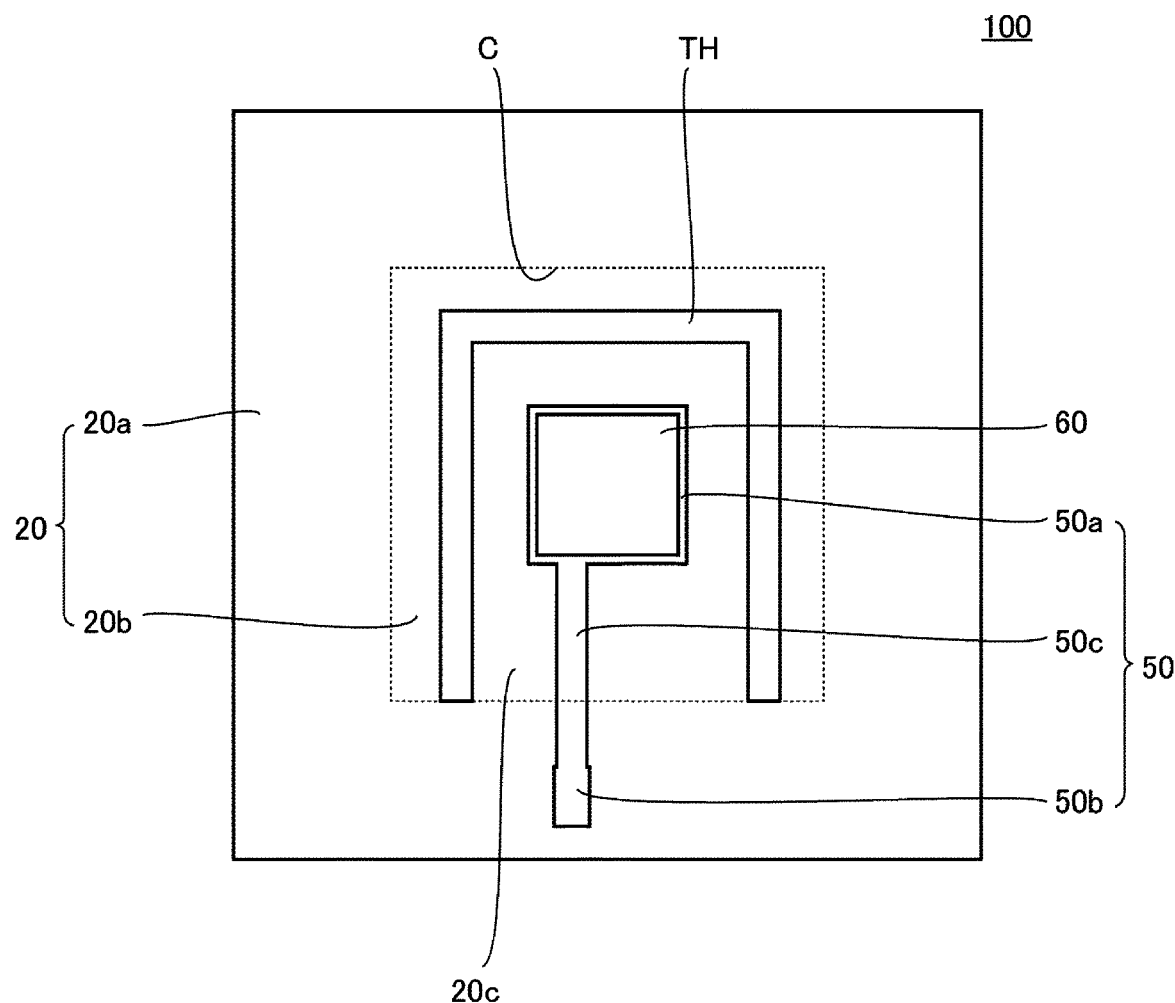

GAS SENSOR

CROSS-REFERENCE TO RELATED APPLICATION

This application is based upon and claims the benefit of priority from Japanese Patent Application No. 2021-090825, filed on May 31, 2021, the entire contents of which are incorporated herein by reference.

TECHNICAL FIELD

The present disclosure relates to a gas sensor.

BACKGROUND

A gas sensor having a substrate, an insulating layer, a solid electrolyte layer, and a microheater is known. A cavity that penetrates the substrate along a thickness direction is formed in the substrate. The insulating layer is arranged on the substrate. The insulating layer has a portion on the substrate around the cavity (hereinafter referred to as a "peripheral portion") and a portion which is on the cavity and is connected to the peripheral portion (hereinafter referred to as a "membrane portion"). The solid electrolyte layer is on the membrane portion.

During an operation of the gas sensor, the solid electrolyte layer is heated to a high temperature (for example, about 500 degrees C.) by the microheater. As a result, in the gas sensor, the solid electrolyte layer may be damaged by a thermal stress.

SUMMARY

Some embodiments of the present disclosure provide a gas sensor capable of suppressing a solid electrolyte layer from being damaged by a thermal stress.

According to one embodiment of the present disclosure, there is provided a gas sensor including a substrate, an insulating layer arranged over the substrate, and a solid electrolyte layer. The substrate is formed with a cavity that penetrates the substrate in a thickness direction of the substrate. The insulating layer has a peripheral portion arranged over the substrate around the cavity, and a membrane portion which is located over the cavity and is connected to the peripheral portion. The membrane portion includes a movable portion. A through-hole, which penetrates the membrane portion around the movable portion in the thickness direction, is formed such that the movable portion is capable of being displaced along the thickness direction. The solid electrolyte layer is arranged over the movable portion.

BRIEF DESCRIPTION OF DRAWINGS

The accompanying drawings, which are incorporated in and constitute a part of the specification, illustrate embodiments of the present disclosure.

FIG. 1B is a plan view of the gas sensor 100 in which illustration of an insulating layer 70 and a porous metal layer 80 is omitted.

DETAILED DESCRIPTION

Figure 1A:
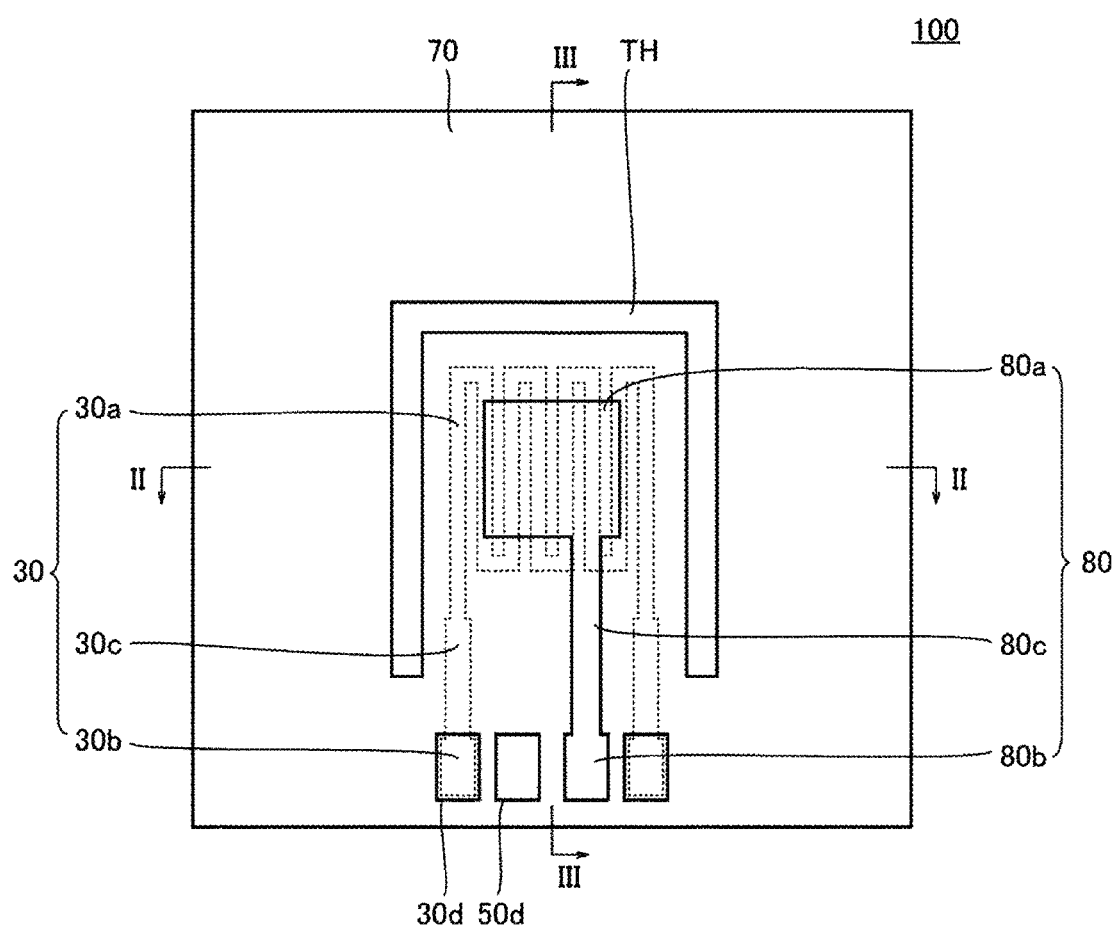
FIG. 1A is a plan view of a gas sensor 100.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Embodiments of the present disclosure will now be described in detail with reference to the drawings. Throughout the drawings, the same or corresponding parts are denoted by the same reference numerals, and explanation thereof will not be repeated.

(Configuration of Gas Sensor According to Embodiment)

A gas sensor (referred to as a "gas sensor 100") according to an embodiment will be described below. The gas sensor 100 is, for example, an oxygen/humidity sensor. However, the gas sensor 100 is not limited thereto.

Figure 2:
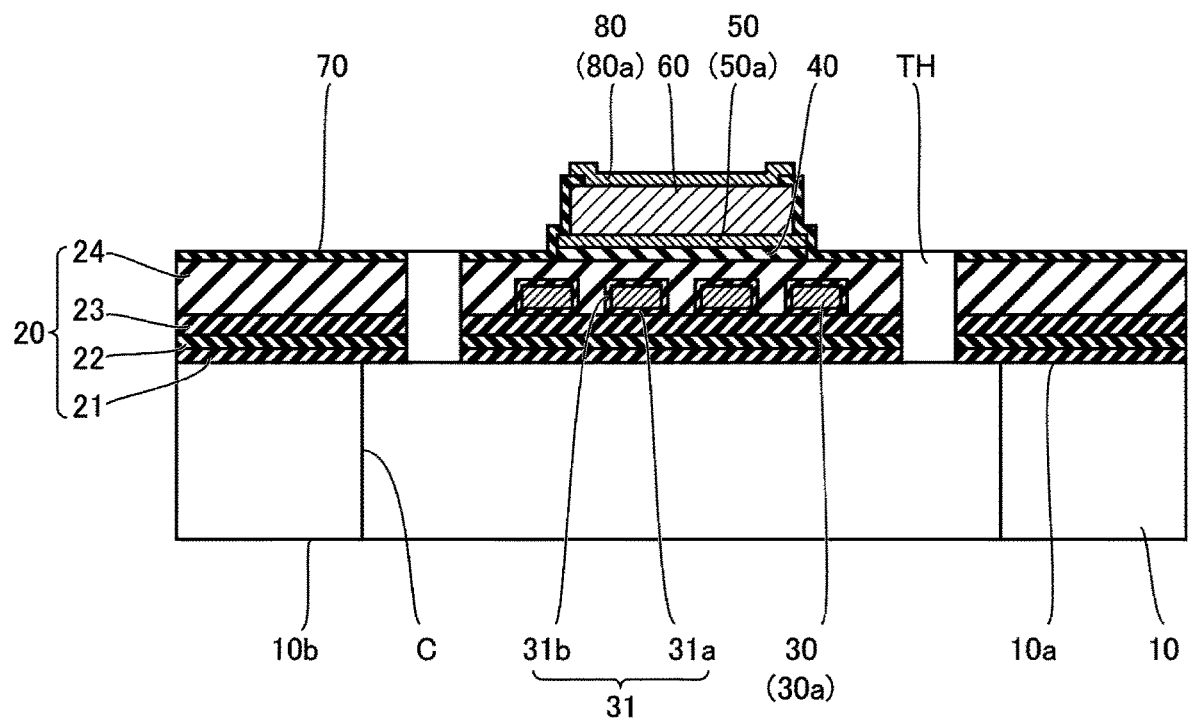
FIG. 2 is a cross-sectional view taken along line II-II in FIG. 1A.
Figure 3:
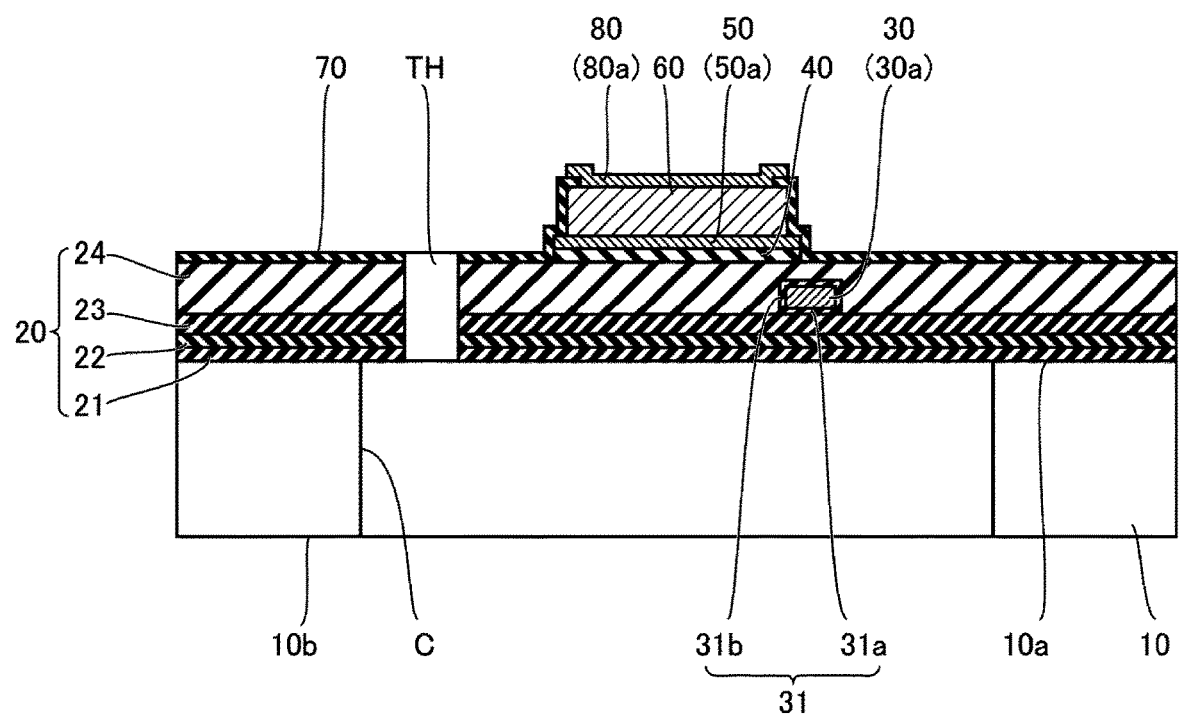
FIG. 3 is a cross-sectional view taken along line III-III in FIG. 1A.

FIG. 1A is a plan view of the gas sensor 100. FIG. 1B is a plan view of the gas sensor 100 in which illustration of an insulating layer 70 and a porous metal layer 80 is omitted. FIG. 2 is a cross-sectional view taken along line II-II in FIG. 1A. FIG. 3 is a cross-sectional view taken along line III-III in FIG. 1A. In FIG. 1A, a wiring 30 is indicated by a dotted line. As shown in FIGS. 1A, 1B, 2, and 3, the gas sensor 100 includes a substrate 10, an insulating layer 20, the wiring 30, a porous oxide layer 40, a porous metal layer 50, a solid electrolyte layer 60, the insulating layer 70, and the porous metal layer 80.

The substrate 10 has a first main surface 10a and a second main surface 10b. The first main surface 10a and the second main surface 10b are end faces in a thickness direction of the substrate 10. The second main surface 10b is the opposite surface of the first main surface 10a. A cavity C is formed in the substrate 10. The cavity C penetrates the substrate 10 along the thickness direction of the substrate 10. The cavity C has a rectangular shape in a plan view (when viewed from a side of the first main surface 10*a* along the thickness direction of the substrate 10). The substrate 10 is formed of, for example, single crystalline silicon.

The insulating layer 20 is arranged over the substrate 10. More specifically, the insulating layer 20 is arranged over the first main surface 10*a*. The insulating layer 20 has, for example, a first layer 21, a second layer 22, a third layer 23, and a fourth layer 24.

The first layer 21 is arranged on the substrate 10 (the first main surface 10*a*). The first layer 21 is formed of, for example, silicon oxide. The second layer 22 is arranged on the first layer 21. The second layer 22 is formed of, for example, silicon nitride. The third layer 23 is arranged on the second layer 22. The third layer 23 is formed of, for example, silicon oxide. The fourth layer 24 is arranged on the third layer 23. The fourth layer 24 is formed of, for example, silicon oxide.

A portion of the insulating layer 20 arranged over the substrate 10 around the cavity C is referred to as a peripheral portion 20*a*. A portion of the insulating layer 20 located over the cavity C is referred to as a membrane portion 20*b*. The membrane portion 20*b* is connected to the peripheral portion 20*a*. As a result, the membrane portion 20*b* is supported on the cavity C.

The wiring 30 is arranged in the insulating layer 20. More specifically, the wiring 30 is arranged on the third layer 23 and is covered with the fourth layer 24. A periphery of the wiring 30 is covered with a barrier layer 31. The barrier layer 31 ensures adhesion between the insulating layer 20 and the wiring 30. The wiring 30 is formed of, for example, platinum. The barrier layer 31 is formed of, for example, titanium oxide. A portion of the barrier layer 31 arranged on the third layer 23 is referred to as a first portion 31*a*, and a portion of the barrier layer 31 covering the wiring 30 is referred to as a second portion 31*b*.

The wiring 30 has a heater portion 30*a*, an end portion 30*b*, and a connection portion 30*c*. The heater portion 30*a* is configured by meandering the wiring 30. The heater portion 30*a* is arranged in the membrane portion 20*b*. The end portion 30*b* is arranged in the peripheral portion 20*a*. The connection portion 30*c* connects the heater portion 30*a* and the end portion 30*b*.

The porous oxide layer 40 is arranged on the insulating layer 20. The porous oxide layer 40 is formed of, for example, tantalum oxide. Since the porous oxide layer 40 is porous, it serves as a flow path for a gas (a detection target gas) detected by the gas sensor 100.

The porous metal layer 50 is arranged on the porous oxide layer 40. The porous metal layer 50 is formed of, for example, platinum. The porous metal layer 50 has an electrode portion 50*a*, an end portion 50*b*, and a connection portion 50*c*. The electrode portion 50*a* is located over the membrane portion 20*b* with the porous oxide layer 40 interposed therebetween. The end portion 50*b* is located over the peripheral portion 20*a* with the porous oxide layer 40 interposed therebetween. The connection portion 30*c* connects the electrode portion 50*a* and the end portion 50*b*.

The solid electrolyte layer 60 is arranged on the porous metal layer 50. More specifically, the solid electrolyte layer 60 is arranged on the electrode portion 50*a*. The solid electrolyte layer 60 has ionic conductivity. The solid electrolyte layer 60 is formed of, for example, yttria-stabilized zirconia.

The insulating layer 70 is arranged on the insulating layer 20 so as to cover the porous oxide layer 40, the porous metal layer 50, and the solid electrolyte layer 60. However, the insulating layer 70 is formed with an opening that at least partially exposes an upper surface of the solid electrolyte layer 60. The insulating layer 70 is, for example, a layer in which a layer formed of silicon oxide and a layer formed of tantalum oxide are stacked.

A pad portion 30*d* and a pad portion 50*d* are arranged on the insulating layer 70. The pad portion 30*d* is electrically connected to the end portion 30*b* via an opening (not shown) formed in the insulating layer 20 (the fourth layer 24) and the insulating layer 70 so as to expose the end portion 30*b*. The pad portion 50*d* is electrically connected to the end portion 50*b* via an opening (not shown) formed in the insulating layer 70 so as to expose the end portion 50*b*.

The porous metal layer 80 has an electrode portion 80*a*, a pad portion 80*b*, and a connection portion 80*c*. The electrode portion 80*a* is arranged on the solid electrolyte layer 60. The pad portion 80*b* is located over the insulating layer 20 with the insulating layer 70 interposed therebetween. The connection portion 80*c* connects the electrode portion 80*a* and the pad portion 80*b*.

A through-hole TH is formed in the membrane portion 20*b* and the insulating layer 70 on the membrane portion 20*b*. The through-hole TH penetrates the membrane portion 20*b* and the insulating layer 70 along the thickness direction of the substrate 10. The membrane portion 20*b* has a movable portion 20*c*. The through-hole TH is located around the movable portion 20*c*. As a result, the movable portion 20*c* can be displaced along the thickness direction of the substrate 10 with a base end side of the movable portion 20*c* as a fulcrum. The through-hole TH is, for example, U-shaped. The heater portion 30*a*, the electrode portion 50*a*, the solid electrolyte layer 60, and the electrode portion 80*a* are located over the movable portion 20*c*.

A width of the wiring 30 constituting the connection portion 30*c* at the base end of the movable portion 20*c* is larger than a width of the wiring 30 constituting the heater portion 30*a*.

(Operation of Gas Sensor 100 According to Embodiment)

An operation of the gas sensor 100 will be described below. Here, the operation of the gas sensor 100 will be described by taking a case of detecting an oxygen gas in a detection target gas, as an example.

By causing a current to pass through the wiring 30, the heater portion 30*a* generates heat due to resistance. As a result, the solid electrolyte layer 60 is heated and exhibits ionic conductivity. When the solid electrolyte layer 60 is yttria-stabilized zirconia, the solid electrolyte layer 60 is heated to about 500 degrees C. by the heater portion 30*a*.

The pad portion 50*d* and the pad portion 80*b* are connected to a negative electrode and a positive electrode of a power supply, respectively. The detection target gas reaches an interface between the electrode portion 50*a* and the solid electrolyte layer 60 via the porous oxide layer 40 and the electrode portion 50*a*. The oxygen gas in the detection target gas that has reached the interface between the electrode portion 50*a* and the solid electrolyte layer 60 becomes oxygen ions by receiving electrons from the electrode portion 50*a*.

These oxygen ions reach an interface between the solid electrolyte layer 60 and the electrode portion 80*a* via the solid electrolyte layer 60. The oxygen ions that have reached the interface between the solid electrolyte layer 60 and the electrode portion 80*a* emit electrons to the electrode portion 80*a* and become an oxygen gas. As a result, a current flows between the pad portion 50*d* and the pad portion 80*b*. This current is proportional to a concentration of oxygen gas in the detection target gas. Therefore, by detecting this current, it is possible to detect the concentration of oxygen gas in the detection target gas.

(Method of Manufacturing Gas Sensor 100 According to Embodiment)

A method of manufacturing the gas sensor 100 will be described below.

Figure 4:
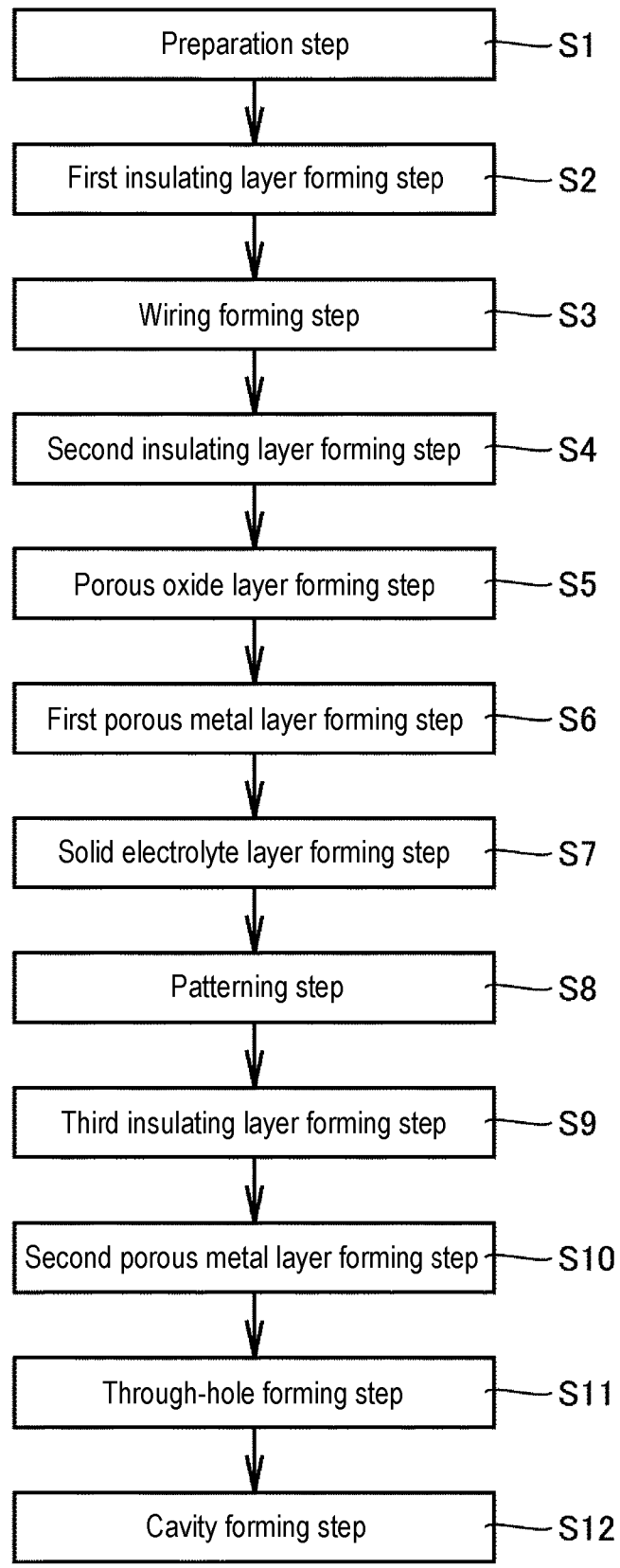
FIG. 4 is a process diagram showing a method of manufacturing the gas sensor 100.

FIG. 4 is a process diagram showing a method of manufacturing the gas sensor 100. As shown in FIG. 4, the method of manufacturing the gas sensor 100 includes a preparation step S1, a first insulating layer forming step S2, a wiring forming step S3, a second insulating layer forming step S4, a porous oxide layer forming step S5, a first porous metal layer forming step S6, a solid electrolyte layer forming step S7, a patterning step S8, a third insulating layer forming step S9, a second porous metal layer forming step S10, a through-hole forming step S11, and a cavity forming step S12.

In the preparation step S1, the substrate 10 is prepared. The cavity C is not formed in the substrate 10 prepared in the preparation step S1.

Figure 5:
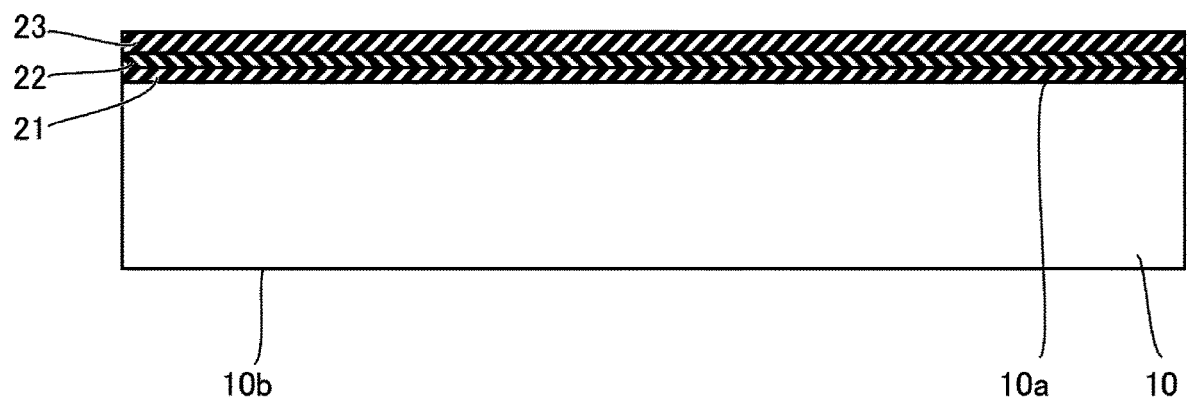
FIG. 5 is a cross-sectional view for explaining a first insulating layer forming step S2.

FIG. 5 is a cross-sectional view for explaining the first insulating layer forming step S2. As shown in FIG. 5, in the first insulating layer forming step S2, the first layer 21, the second layer 22, and the third layer 23 are sequentially formed. The formation of the first layer 21, the second layer 22, and the third layer 23 is performed, for example, by using a CVD (Chemical Vapor Deposition) method.

Figure 6:
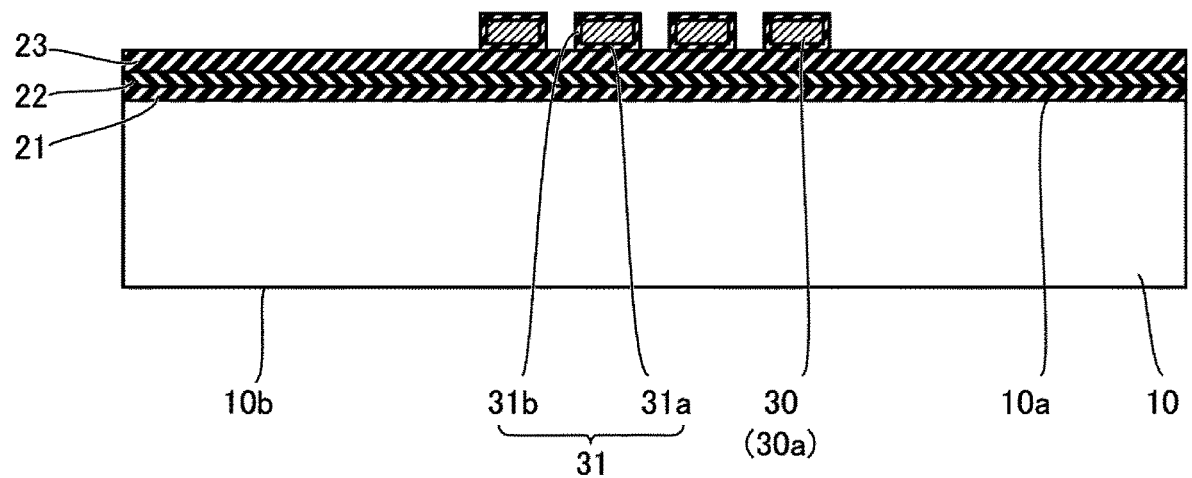
FIG. 6 is a cross-sectional view for explaining a wiring forming step S3.

FIG. 6 is a cross-sectional view for explaining the wiring forming step S3. As shown in FIG. 6, in the wiring forming step S3, the wiring 30 and the barrier layer 31 are formed. In the wiring forming step S3, first, the first portion 31a is formed. The first portion 31a is formed by forming a film of a constituent material of the barrier layer 31 and patterning the formed film. This film formation is performed, for example, by using a sputtering method. This patterning is performed by forming a mask using a photolithography method and etching the film by using the mask.

In the wiring forming step S3, second, the wiring 30 is formed. The wiring 30 is formed by forming a film of a constituent material of the wiring 30 and patterning the formed film. This film formation is performed, for example, by using a sputtering method. This patterning is performed by forming a mask using a photolithography method and etching the film by using the mask. In the wiring forming step S3, third, the second portion 31b is formed. The second portion 31b is formed by forming a film of the constituent material of the barrier layer 31 and patterning the formed film. This film formation is performed, for example, by using a sputtering method. This patterning is performed by forming a mask using a photolithography method and etching the film by using the mask.

Figure 7:
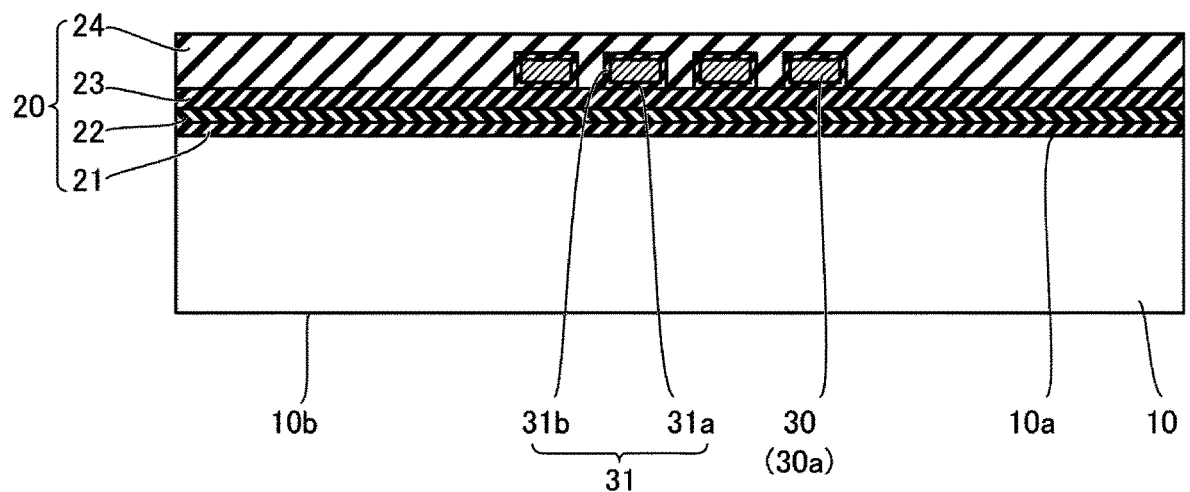
FIG. 7 is a cross-sectional view for explaining a second insulating layer forming step S4.
Figure 8:
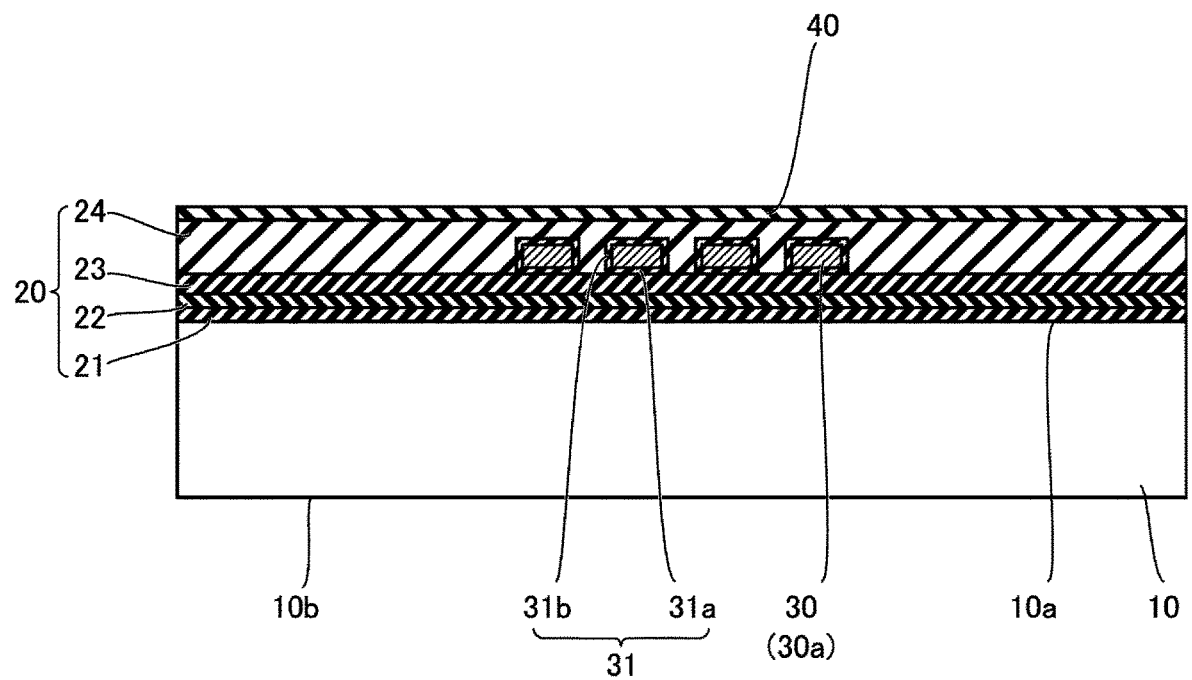
FIG. 8 is a cross-sectional view for explaining a porous oxide layer forming step S5.

FIG. 7 is a cross-sectional view for explaining the second insulating layer forming step S4. As shown in FIG. 7, in the second insulating layer forming step S4, the fourth layer 24 is formed. The formation of the fourth layer 24 is performed, for example, by using a CVD method. FIG. 8 is a cross-sectional view for explaining the porous oxide layer forming step S5. As shown in FIG. 8, in the porous oxide layer forming step S5, the porous oxide layer 40 is formed. The formation of the porous oxide layer 40 is performed, for example, by using a deposition method.

Figure 9:
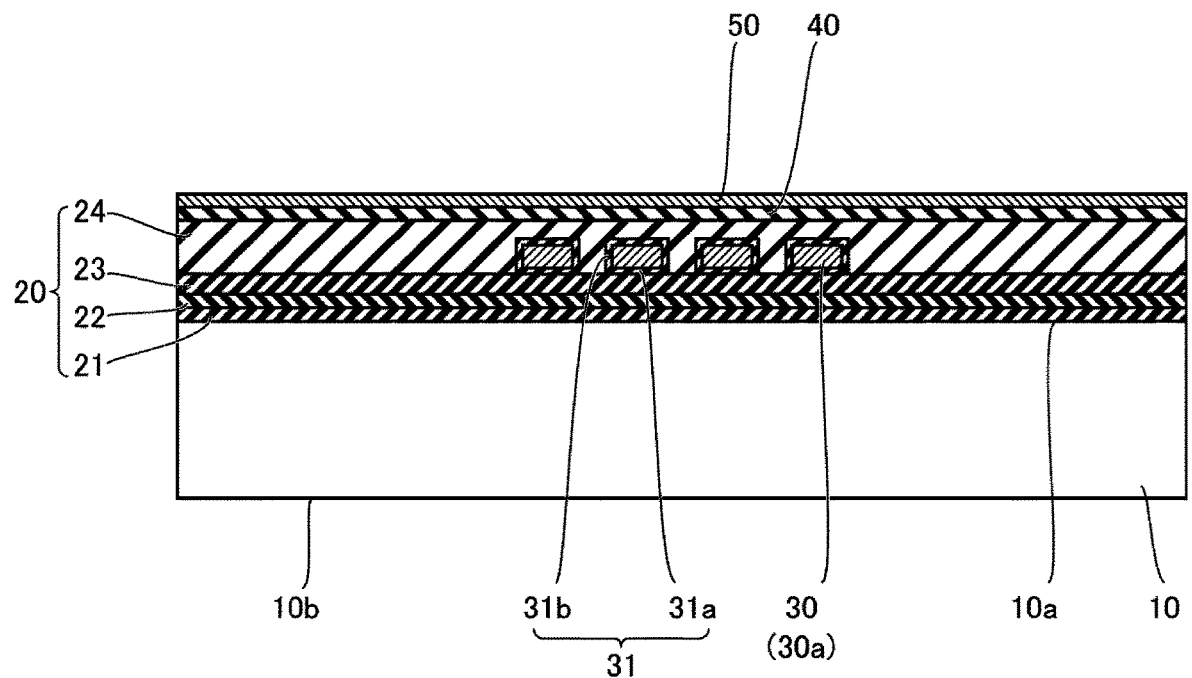
FIG. 9 is a cross-sectional view for explaining a first porous metal layer forming step S6.

FIG. 9 is a cross-sectional view for explaining the first porous metal layer forming step S6. As shown in FIG. 9, in the first porous metal layer forming step S6, the porous metal layer 50 is formed. The porous metal layer 50 is formed, for example, by using a sputtering method.

Figure 10:
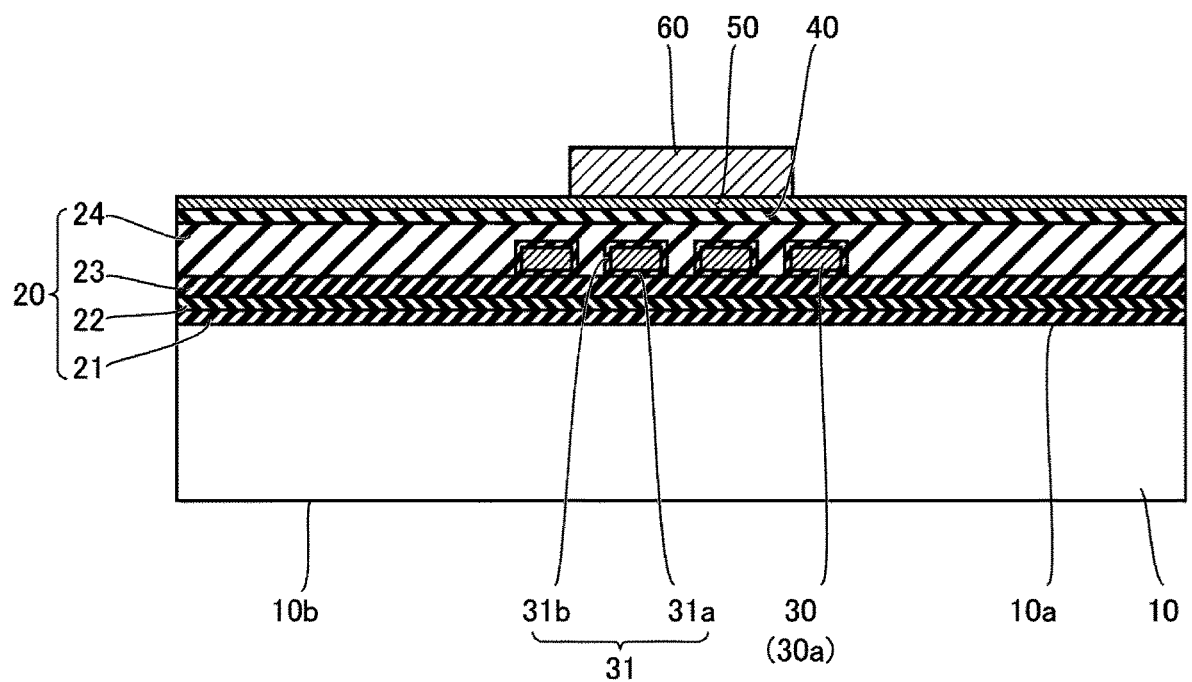
FIG. 10 is a cross-sectional view for explaining a solid electrolyte layer forming step S7.
Figure 11:
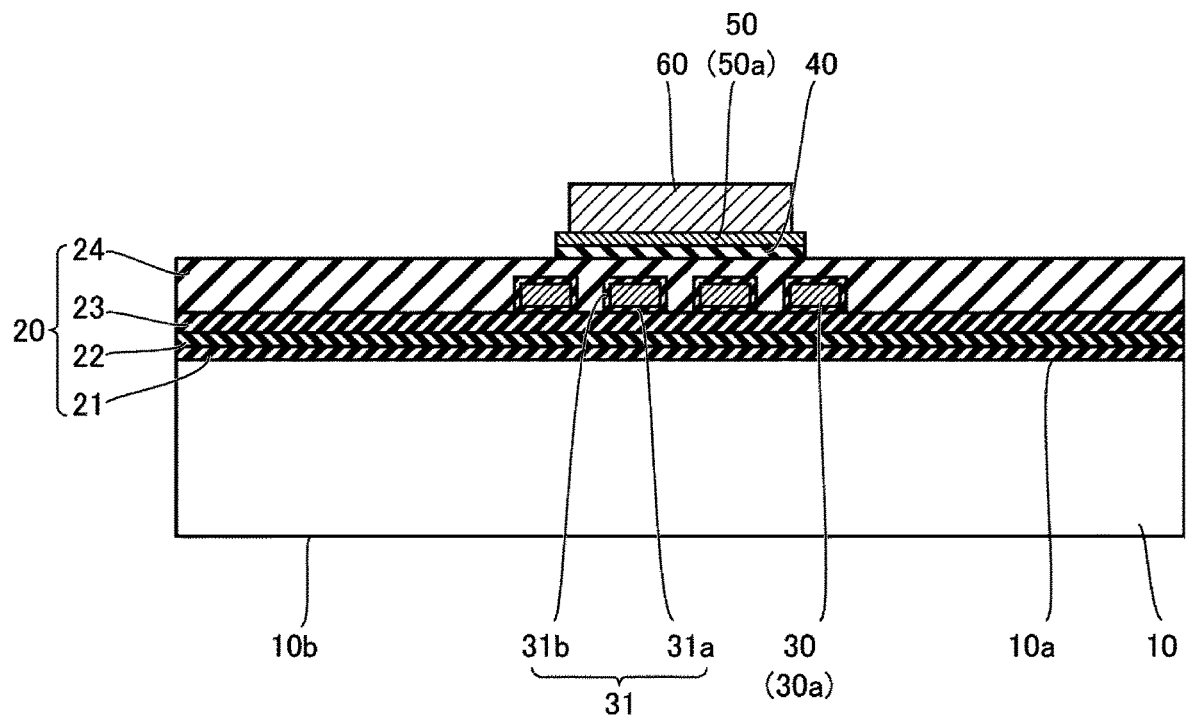
FIG. 11 is a cross-sectional view for explaining a patterning step S8.

FIG. 10 is a cross-sectional view for explaining the solid electrolyte layer forming step S7. As shown in FIG. 10, in the solid electrolyte layer forming step S7, the solid electrolyte layer 60 is formed. The solid electrolyte layer 60 is formed by forming a film of a constituent material of the solid electrolyte layer 60 and patterning the formed film. This film formation is performed, for example, by using a sputtering method. This patterning is performed by, for example, dry etching. FIG. 11 is a cross-sectional view for explaining the patterning step S8. As shown in FIG. 11, in the patterning step S8, the porous oxide layer 40 and the porous metal layer 50 are patterned. This patterning is performed by, for example, dry etching.

Figure 12:
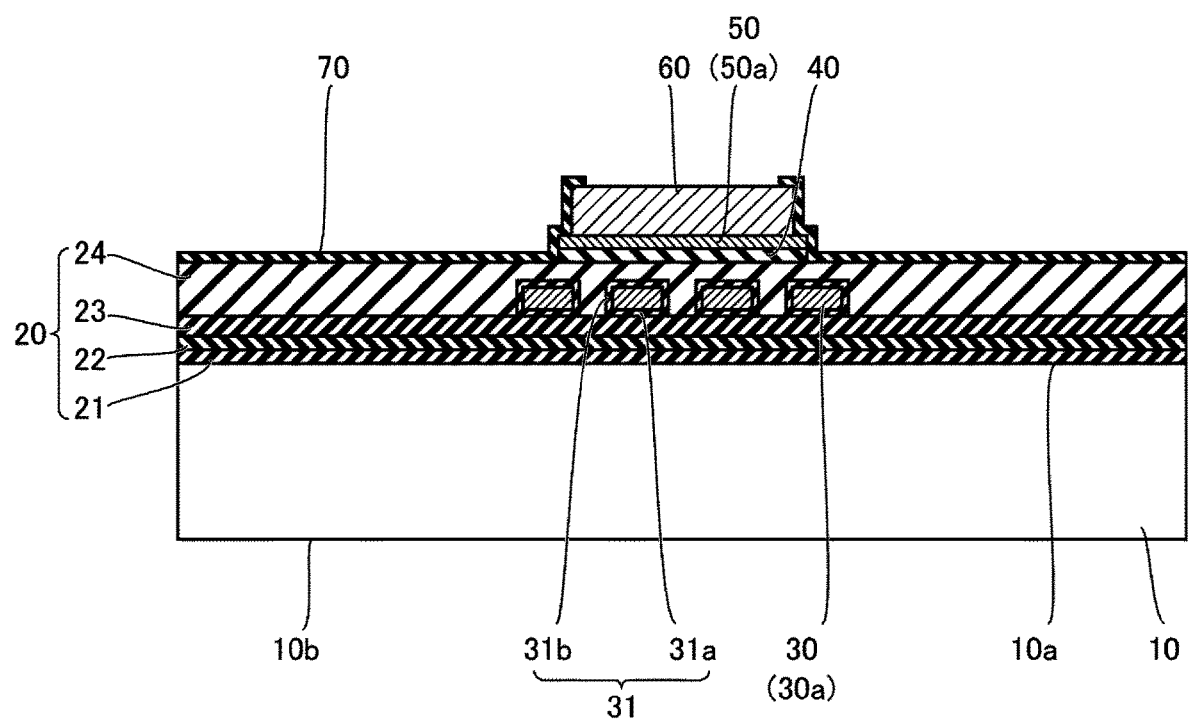
FIG. 12 is a cross-sectional view for explaining a third insulating layer forming step S9.
Figure 13:
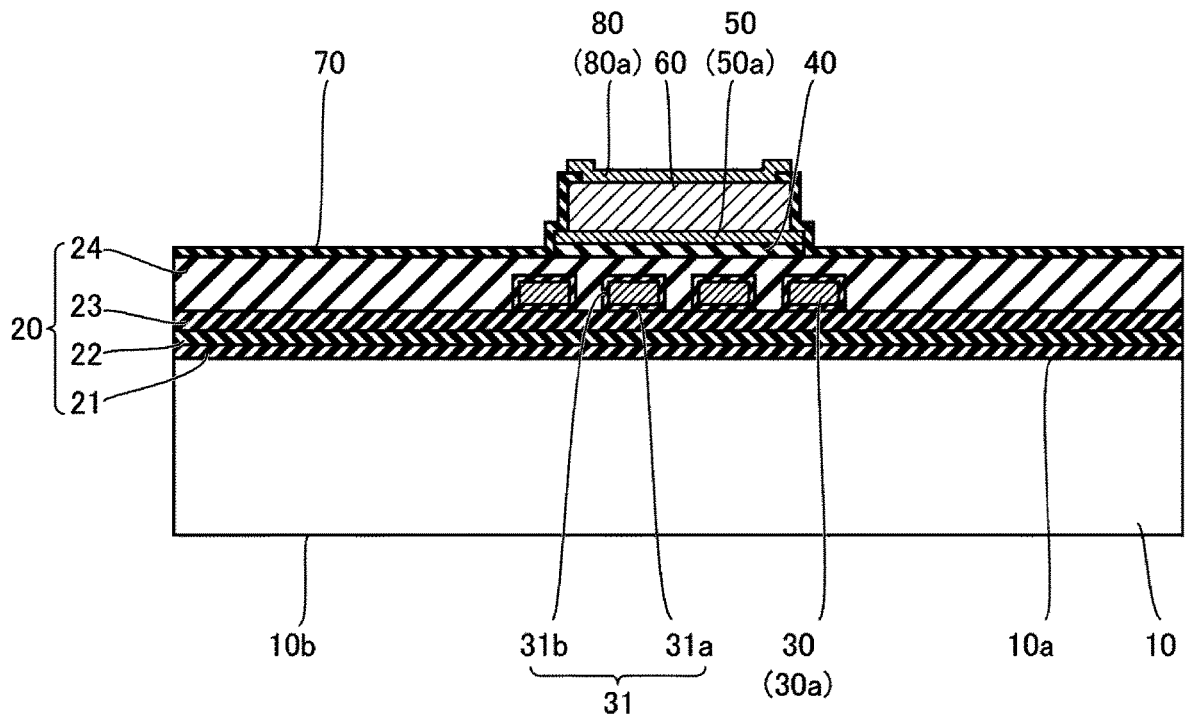
FIG. 13 is a cross-sectional view for explaining a second porous metal layer forming step S10.

FIG. 12 is a cross-sectional view for explaining the third insulating layer forming step S9. As shown in FIG. 12, in the third insulating layer forming step S9, the insulating layer 70 is formed. The formation of the insulating layer 70 is performed, for example, by using a sputtering method. In addition, the insulating layer 70 is subjected to an etching process so as to form an opening that exposes the solid electrolyte layer 60. FIG. 13 is a cross-sectional view for explaining the second porous metal layer forming step S10. As shown in FIG. 13, in the second porous metal layer forming step S10, the porous metal layer 80 is formed. The porous metal layer 80 is formed by forming a film of a constituent material of the porous metal layer 80 and patterning the formed film. This film formation is performed by, for example, a sputtering method. This patterning is performed by, for example, dry etching.

Figure 14:
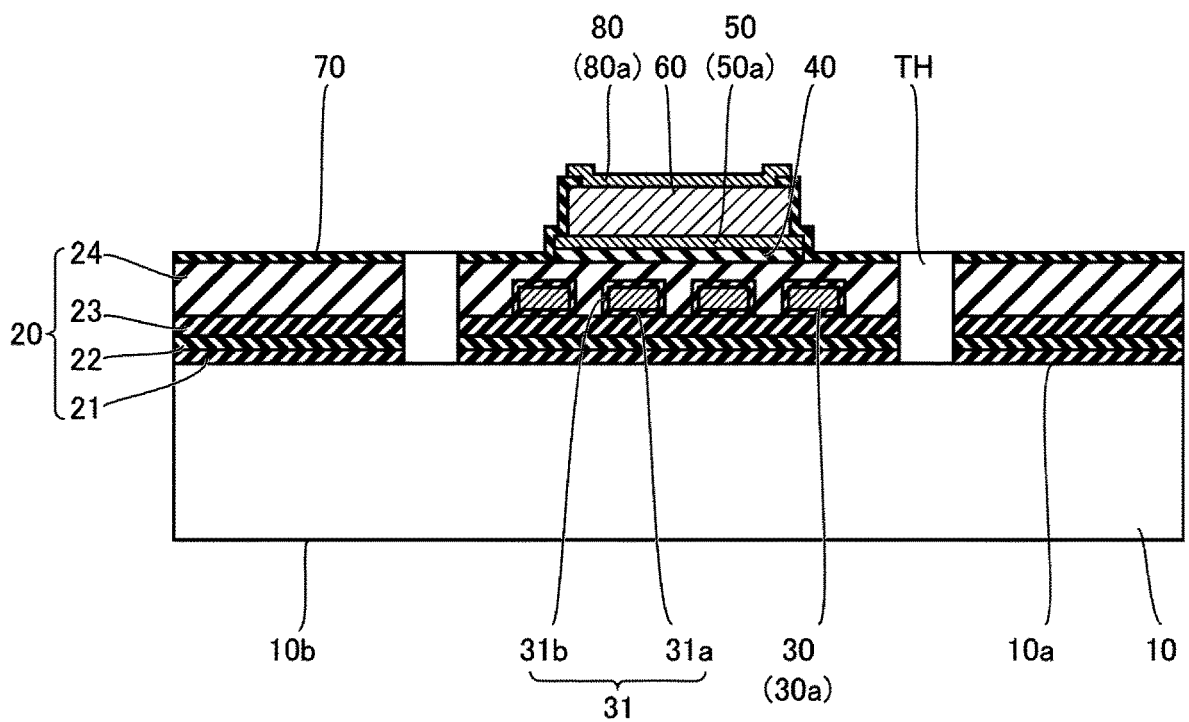
FIG. 14 is a cross-sectional view for explaining a through-hole forming step S11.

FIG. 14 is a cross-sectional view for explaining the through-hole forming step S11. As shown in FIG. 14, in the through-hole forming step S11, the through-hole TH is formed in the insulating layer 20 and the insulating layer 70. The formation of the through-hole TH is performed by, for example, dry etching. In the cavity forming step S12, the cavity C is formed. The cavity C is formed by, for example, wet etching. From the above, the gas sensor 100 having the structures shown in FIGS. 1A, 1B, 2, and 3 is formed.

(Effects of Gas Sensor According to Embodiment)

Effects of the gas sensor 100 according to the embodiment will be described below.

When the gas sensor 100 detects the detection target gas, the heater portion 30a heats the solid electrolyte layer 60. If the membrane portion 20b restricts thermal expansion of the solid electrolyte layer 60 when the solid electrolyte layer 60 is heated by the heater portion 30a, the solid electrolyte layer 60 may be cracked due to a thermal stress. This problem is remarkable when the solid electrolyte layer 60 is formed of a material which requires being heated to a high temperature, such as yttria-stabilized zirconia.

However, in the gas sensor 100, the membrane portion 20b has the movable portion 20c, and the solid electrolyte layer 60 is arranged on the movable portion 20c. The movable portion 20c can be displaced along the thickness direction of the substrate 10 because the through-hole TH is formed around the movable portion 20c. Therefore, when the solid electrolyte layer 60 is heated, the movable portion 20c is displaced to alleviate the thermal stress applied to the solid electrolyte layer 60, so that the solid electrolyte layer 60 is less likely to be cracked.

In the gas sensor 100, the width of the wiring 30 constituting the connection portion 30c at the base end of the movable portion 20c is larger than the width of the wiring 30 constituting the heater portion 30a. Therefore, in the gas sensor 100, the wiring 30 is suppressed from being disconnected due to the displacement of the movable portion 20c.

(First Modification)

Figure 15:
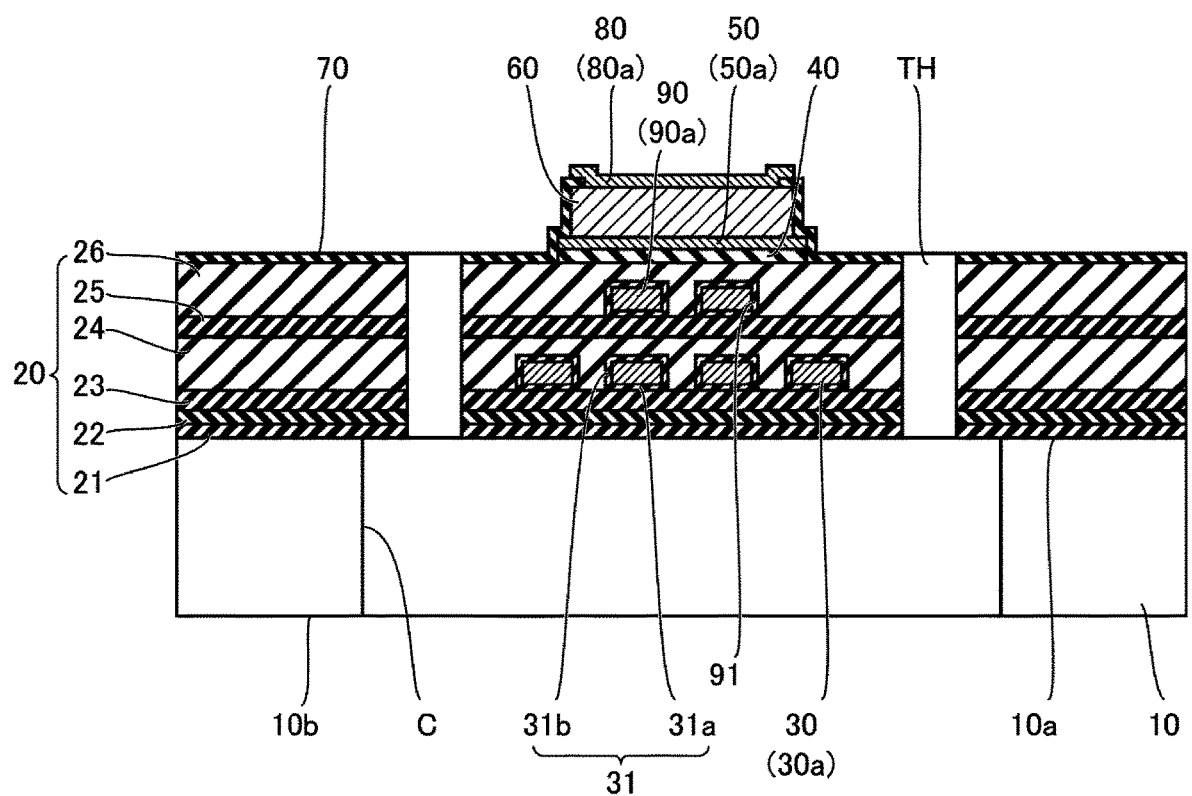
FIG. 15 is a cross-sectional view of a gas sensor 100 according to a first modification.

FIG. 15 is a cross-sectional view of the gas sensor 100 according to a first modification. As shown in FIG. 15, the insulating layer 20 may further include a fifth layer 25 arranged on the fourth layer 24, and a sixth layer 26 arranged on the fifth layer 25. The fifth layer 25 is formed of, for example, silicon nitride. The sixth layer 26 is formed of, for example, silicon oxide. The gas sensor 100 may further have a wiring 90. The wiring 90 is formed of, for example, platinum. The wiring 90 is arranged in the insulating layer 20. More specifically, the wiring 90 is arranged on the fifth layer 25 and is covered with the sixth layer 26.

A barrier layer 91 is arranged around the wiring 90. The barrier layer 91 is formed of, for example, titanium oxide, and secures adhesion between the barrier layer 91 and the insulating layer 20 (the fifth layer 25 and the sixth layer 26). The wiring 90 has a portion which is arranged in the movable portion 20c in a meandering manner and constitutes a temperature sensor portion 90a.

(Second Modification)

Figure 16:
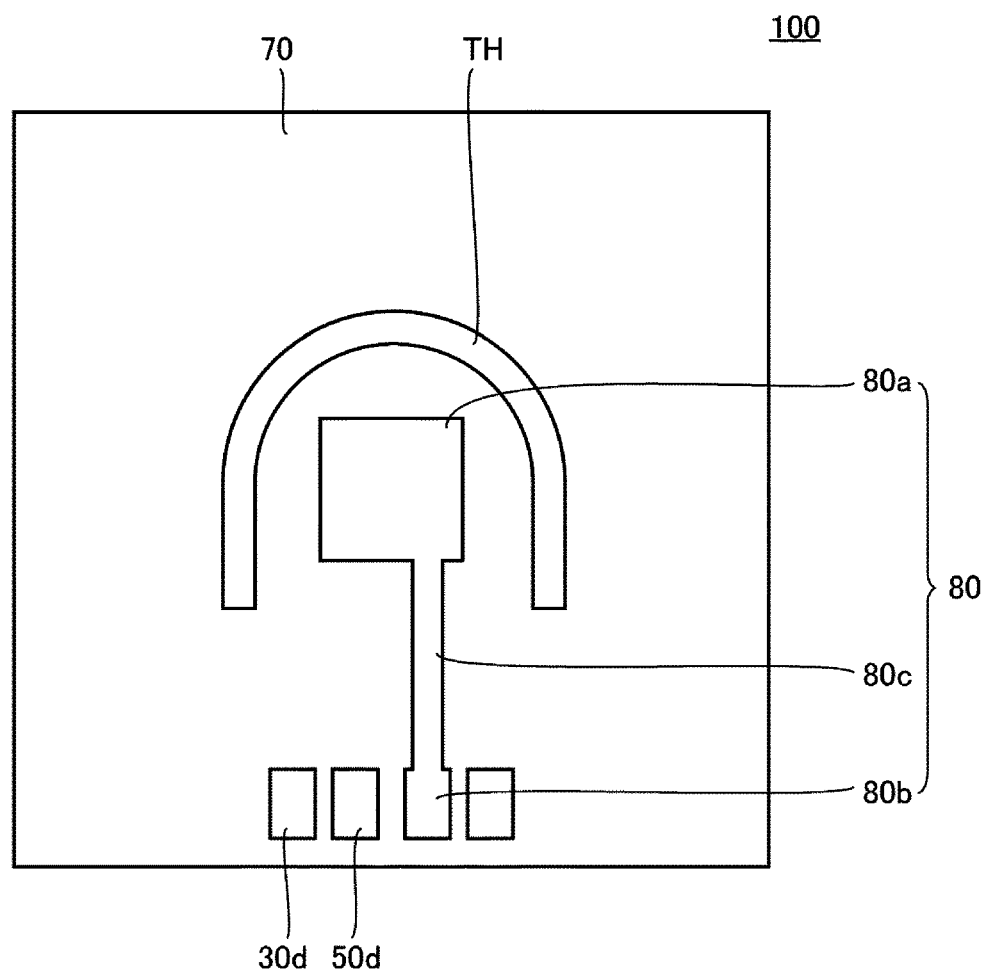
FIG. 16 is a plan view of a gas sensor 100 according to a second modification.

FIG. 16 is a plan view of the gas sensor 100 according to a second modification. As shown in FIG. 16, the through-hole TH may be formed in a curved shape in a plan view. This makes it possible to suppress stress concentration around the movable portion 20c.

According to the present disclosure in some embodiments, it is possible to provide a gas sensor capable of suppressing a solid electrolyte layer from being damaged by a thermal stress.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A gas sensor comprising:
   a substrate;
   a first insulating layer arranged over the substrate;
   a lower electrode arranged on the first insulating layer;
   a solid electrolyte layer arranged on the lower electrode;
   an upper electrode arranged on the solid electrolyte layer; and
   a second insulating layer arranged on the first insulating layer and covering at least one of a side surface portion or an upper surface portion of the solid electrolyte layer,
   wherein, when the second insulating layer covers the side surface portion, the side surface portion covered by the second insulating layer is disposed between the lower electrode and the upper electrode,
   wherein, when the second insulating layer covers the upper surface portion, the second insulating layer is in contact with the upper electrode,
   wherein the substrate is formed with a cavity that penetrates the substrate in a thickness direction of the substrate,
   wherein the first insulating layer has a peripheral portion arranged over the substrate around the cavity, and a membrane portion which is located over the cavity and is connected to the peripheral portion,
   wherein the membrane portion includes a movable portion,
   wherein a through-hole, which penetrates the membrane portion around the movable portion and the second insulating layer in the thickness direction, is formed such that the movable portion is connected to the peripheral portion via only one connection portion and is capable of being displaced along the thickness direction, and
   wherein the solid electrolyte layer is arranged over the movable portion.

2. The gas sensor of claim 1, wherein the through-hole is formed in a curved shape in a plan view.

3. The gas sensor of claim 1, wherein the solid electrolyte layer is formed of yttria-stabilized zirconia.

4. The gas sensor of claim 1, further comprising:
   a wiring arranged in the first insulating layer,
   wherein the wiring has a heater portion arranged in the movable portion, an end portion arranged in the peripheral portion, and a connection portion connecting the heater portion and the end portion, and
   wherein a width of the wiring constituting the connection portion at a base end of the movable portion is larger than a width of the wiring constituting the heater portion.

5. The gas sensor of claim 1, wherein the through-hole is of a shape that has three continuously-connected sides in a plan view.

* * * * *